US012678880B2

(12) United States Patent
Han et al.

(10) Patent No.: US 12,678,880 B2
(45) Date of Patent: Jul. 14, 2026

(54) DEVICE AND METHOD FOR OPTIMIZING CONTROL PARAMETER OF SOLDER PRINTING APPARATUS

(71) Applicant: KOH YOUNG TECHNOLOGY INC., Seoul (KR)

(72) Inventors: Guk Han, Ansan-si (KR); Jae Hwan Lee, Seoul (KR); Duk Young Lee, Suwon-si (KR); Chan Woo Park, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 683 days.

(21) Appl. No.: 17/789,725

(22) PCT Filed: May 31, 2021

(86) PCT No.: PCT/KR2021/006721
§ 371 (c)(1),
(2) Date: Jun. 28, 2022

(87) PCT Pub. No.: WO2021/242062
PCT Pub. Date: Dec. 2, 2021

(65) Prior Publication Data
US 2023/0073723 A1 Mar. 9, 2023

(30) Foreign Application Priority Data

May 29, 2020 (KR) ........................ 10-2020-0064967

(51) Int. Cl.
*B23K 3/00* (2006.01)
*G05B 13/04* (2006.01)
(52) U.S. Cl.
CPC .............. *B23K 3/00* (2013.01); *G05B 13/042* (2013.01)

(58) Field of Classification Search
None
See application file for complete search history.

(56) References Cited

U.S. PATENT DOCUMENTS 5,542,600 A 8/1996 Kobayashi et al.
9,419,543 B2 8/2016 Durham et al.
(Continued)

FOREIGN PATENT DOCUMENTS

CN 110194003 9/2019
CN 110315198 10/2019
(Continued)

OTHER PUBLICATIONS

Csaba Benedek et al., "Solder Paste Scooping Detection by Multi-level Visual Inspection of Printed Circuit Boards", IEEE Transactions on Industrial Electronics, IEEE Service Center, Piscataway, NJ, USA, vol. 60, No. 6, Jun. 2013 (Jun. 2013), pp. 2318-233.
(Continued)

*Primary Examiner* — Kamini S Shah
*Assistant Examiner* — Anzuman Sharmin
(74) *Attorney, Agent, or Firm* — KILE PARK REED & HOUTTEMAN PLLC

(57) ABSTRACT

An electronic apparatus according to various embodiments of the present disclosure may include: a communication circuit that is communicatively connected to a solder printing apparatus and a measurement apparatus; one or more memories; and one or more processors. One or more processors may be configured to: acquire a first control parameter set of the solder printing apparatus for printing solder on a first substrate; transmit information indicating the first control parameter set to the solder printing apparatus; acquire first solder measurement information indicating a state of the solder printed on the first substrate; determine a first yield for the first substrate based on the first solder
(Continued)

measurement information; and generate a model for searching for an optimal control parameter set based on a first data pair including the first control parameter set and the first yield.

20 Claims, 8 Drawing Sheets

(56) References Cited

U.S. PATENT DOCUMENTS

| | | | |
|---|---|---|---|
| 10,896,271 B1 * | 1/2021 | Baudart | .................... H02K 3/42 |
| 11,783,099 B2 * | 10/2023 | Tallman | .................... G06N 7/08 |
| | | | 703/2 |
| 2004/0244613 A1 | 12/2004 | Barajas et al. | |
| 2007/0090164 A1 | 4/2007 | Barajas et al. | |
| 2012/0201587 A1 * | 8/2012 | Kato | ........................ B41F 15/36 |
| | | | 400/76 |
| 2012/0290998 A1 * | 11/2012 | Liang | ...................... H01L 22/20 |
| | | | 716/132 |
| 2013/0174111 A1 | 7/2013 | Durkan | |
| 2013/0193123 A1 | 8/2013 | Saint-Martin et al. | |
| 2016/0350671 A1 * | 12/2016 | Morris, II | .......... G05B 23/0229 |
| 2018/0049356 A1 | 2/2018 | Mori et al. | |
| 2019/0269017 A1 | 8/2019 | Lee et al. | |
| 2020/0356711 A1 * | 11/2020 | Egan | ....................... G06F 30/20 |
| 2020/0383212 A1 * | 12/2020 | Gong | ....................... G06F 30/39 |
| 2022/0011728 A1 * | 1/2022 | Zhang | ................. G05B 13/027 |
| 2022/0236647 A1 * | 7/2022 | Hauptmann | .......... G03F 7/7065 |
| 2023/0161325 A1 * | 5/2023 | Held | ................. G05B 19/4155 |
| | | | 700/28 |

FOREIGN PATENT DOCUMENTS

| | | |
|---|---|---|
| CN | 110427593 | 11/2019 |
| CN | 110773378 | 2/2020 |
| EP | 2790473 | 10/2014 |
| EP | 3501828 | 6/2019 |
| EP | 3530463 | 8/2019 |
| JP | 2005-157835 | 6/2005 |
| JP | 2008-152341 | 7/2008 |
| JP | 2018-025481 | 2/2018 |
| KR | 10-2013-0100266 | 9/2013 |
| KR | 10-2017-0003296 | 1/2017 |
| KR | 10-2019-0102974 | 9/2019 |
| WO | 2019/208039 | 10/2019 |

OTHER PUBLICATIONS

European search report for European Patent Application No. 21812422.0, dated Jan. 9, 2023.

International Search Report for PCT/KR2021/006721 dated Sep. 10, 2021.

PCT written opinion PCT/KR2021/006721 dated Sep. 10, 2021.

Korean Office Action dated Dec. 19, 2024, in Korean Patent Application No. 10-2022-7020380 [including machine English translation].

Japanese Office Action with English Translation for Japanese Patent Application No. 2022-538480, dated May 23, 2023.

Chinese Office Action dated Jul. 16, 2025, in Chinese Patent Application No. 202180007443.1.

* cited by examiner

Figure 3:
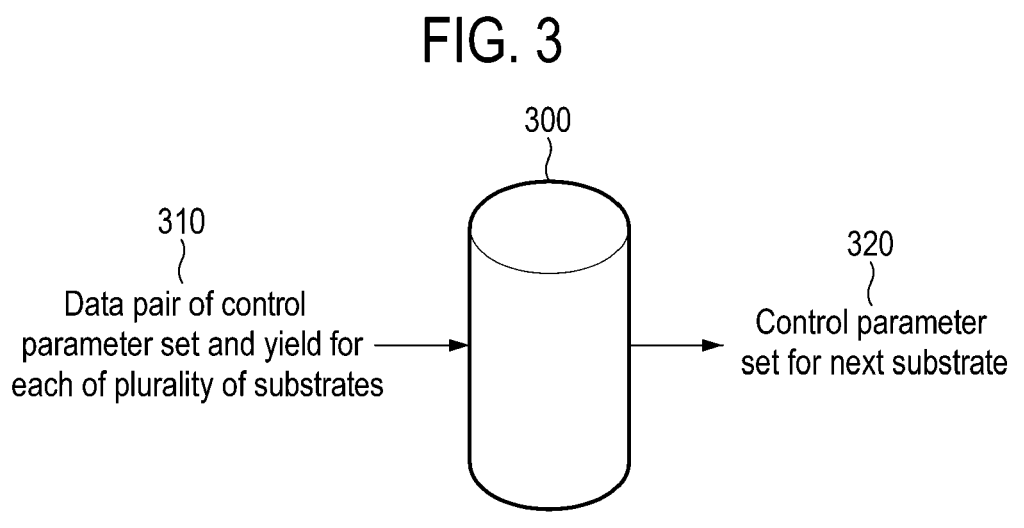

Data pair of control
parameter set and yield for
each of plurality of substrates

320

Control parameter
set for next substrate

Yield $t_0$ $t_1$ $t_2$ $t_3$

Order of substrates to
be subjected to substrate
processing step

Figure 6:
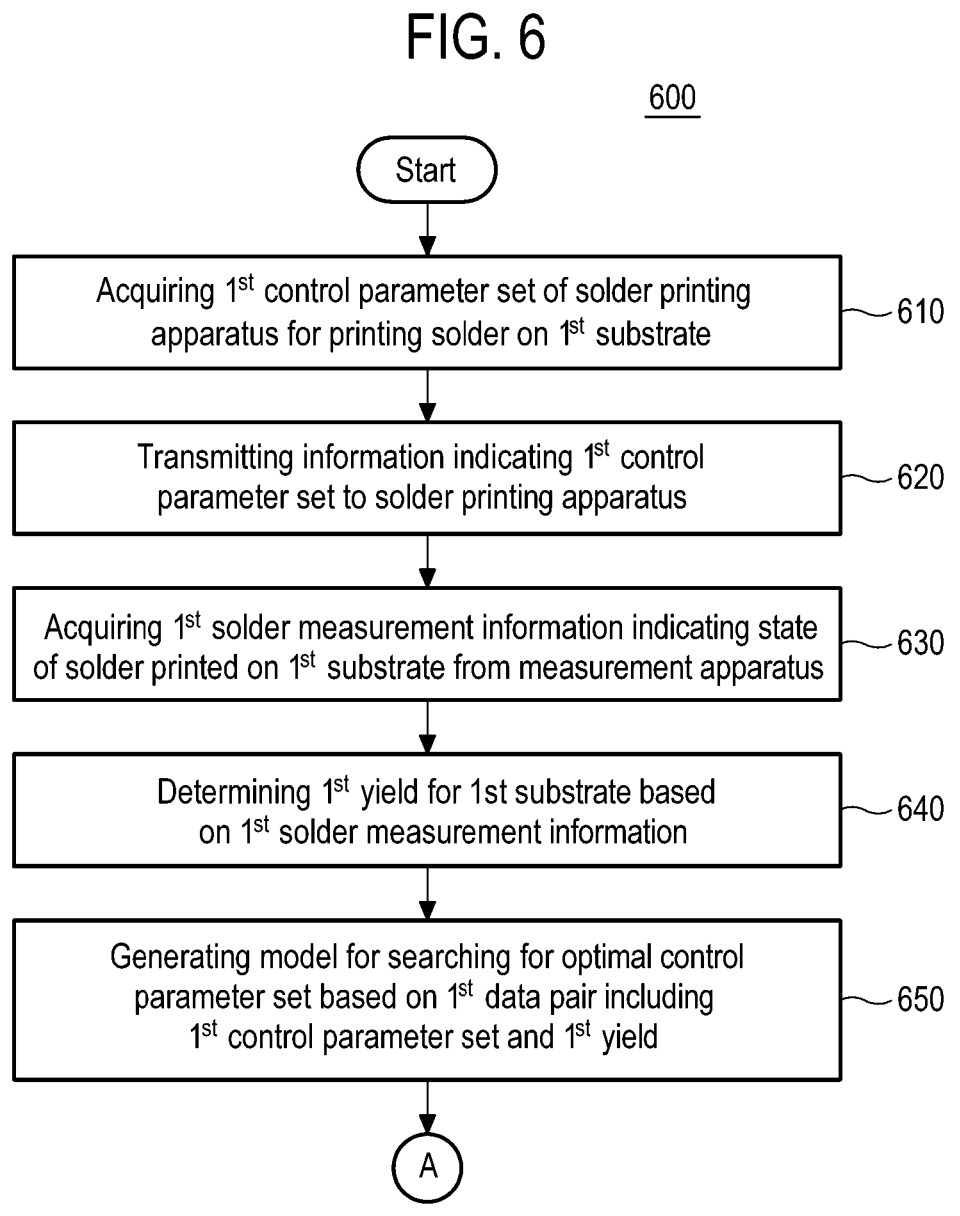

Start

Acquiring 1st control parameter set of solder printing apparatus for printing solder on 1st substrate — 610

Transmitting information indicating 1st control parameter set to solder printing apparatus — 620

Acquiring 1st solder measurement information indicating state of solder printed on 1st substrate from measurement apparatus — 630

Determining 1st yield for 1st substrate based on 1st solder measurement information — 640

Generating model for searching for optimal control parameter set based on 1st data pair including 1st control parameter set and 1st yield — 650

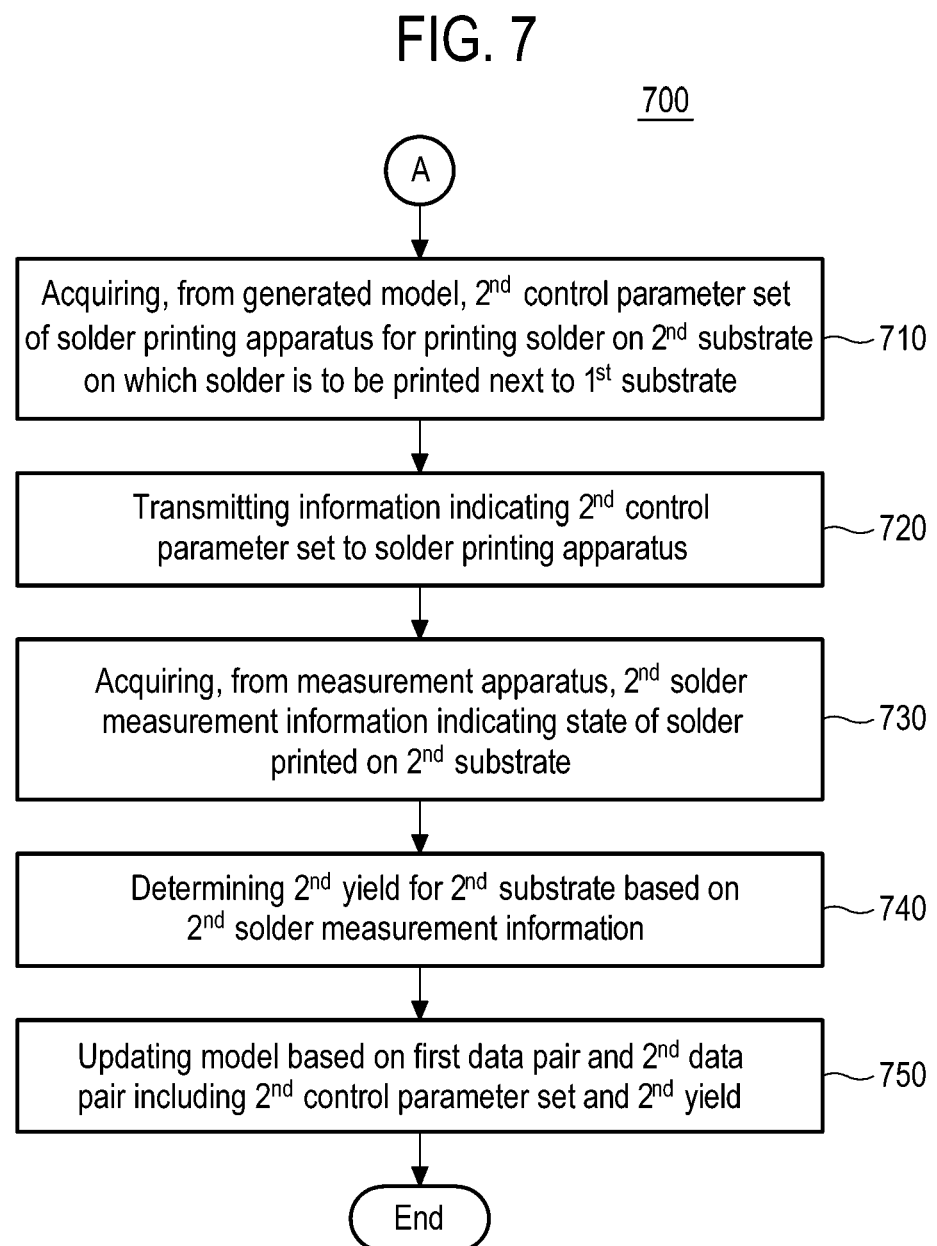

700

A

Acquiring, from generated model, 2nd control parameter set of solder printing apparatus for printing solder on 2nd substrate on which solder is to be printed next to 1st substrate ⟶ 710

Transmitting information indicating 2nd control parameter set to solder printing apparatus ⟶ 720

Acquiring, from measurement apparatus, 2nd solder measurement information indicating state of solder printed on 2nd substrate ⟶ 730

Determining 2nd yield for 2nd substrate based on 2nd solder measurement information ⟶ 740

Updating model based on first data pair and 2nd data pair including 2nd control parameter set and 2nd yield ⟶ 750

End

DEVICE AND METHOD FOR OPTIMIZING CONTROL PARAMETER OF SOLDER PRINTING APPARATUS

CROSS REFERENCE TO RELATED APPLICATIONS

The application is a national entry of International Application No. PCT/KR2021/006721, filed on May 31, 2021, which claims under 35 U.S.C. § 119(a) and 365 (b) priority to and benefits of Korean Patent Application No. 10-2020-0064967, filed on May 29, 2020 in the Korean Intellectual Property Office, the entire contents of which are incorporated herein by reference.

TECHNICAL FIELD

The present disclosure relates to a device and method for optimizing control parameters of a solder printing apparatus.

BACKGROUND

Before mounting components on a substrate (e.g., a printed circuit board), a solder printing apparatus (e.g., a screen printer) may apply solder on the pads of the substrate. Thereafter, a solder paste inspection (SPI) device may inspect the state of the applied solder. After the inspection, on the pads of the printed circuit substrate to which the solder is applied, components may be mounted according to a surface mount technology (SMT).

Based on a plurality of control parameters, the operation of the solder printing apparatus to print solder on the substrate is controlled. The plurality of control parameters include a control parameter for adjusting a print pressure, a control parameter for adjusting a print speed, and a control parameter for adjusting a separating speed. When a plurality of optimal control parameters are used, it is possible to improve a yield (or a non-defective ratio) for the solder printed on the substrate.

SUMMARY

The present disclosure provides a technique for optimizing a plurality of control parameters of a solder printing apparatus.

According to various embodiments of the present disclosure, the electronic device may include: a communication circuit that is communicatively connected to a solder printing apparatus configured to print solder on each of a plurality of substrates based on a plurality of control parameters and a measurement apparatus configured to measure a state of the solder printed on each of the plurality of substrates transferred from the solder printing apparatus; one or more memories; and one or more processors that are operatively connected to the communication circuit and the one or more memories. The one or more processors according to various embodiments may be configured to: acquire a first control parameter set of the solder printing apparatus for printing solder on a first substrate; transmit information indicating the first control parameter set to the solder printing apparatus; acquire, from the measurement apparatus, first solder measurement information indicating a state of the solder printed on the first substrate to the solder printing apparatus; determine a first yield for the first substrate based on the first solder measurement information; and generate a model for searching for an optimal control parameter set based on a first data pair including the first control parameter set and the first yield.

According to various embodiments of the present disclosure, there is provided a method of optimizing a control parameter of an electronic device that is communicatively connected to a solder printing apparatus configured to print solder on each of a plurality of substrates based on a plurality of control parameters and a measurement apparatus configured to measure a state of the solder printed on each of the plurality of substrates transferred from the solder printing apparatus, wherein the method may include: acquiring a first control parameter set of the solder printing apparatus for printing solder on a first substrate; transmitting information indicating the first control parameter set to the solder printing apparatus; an operation of acquiring, from the measurement apparatus, first solder measurement information indicating a state of the solder printed on the first substrate; determining a first yield for the first substrate based on the first solder measurement information; and generating a model for searching for an optimal control parameter set based on a first data pair including the first control parameter set and the first yield.

According to various embodiments of the present disclosure, by generating and updating a model for searching for an optimal control parameter set based on data (e.g., a control parameter set and a yield) collected in real time, it is not necessary to create a model based on existing historical data and to perform optimization of the model. In addition, since variations and states of solder, stencil, and squeegee that affect a solder printing step may change over time, the existing accumulated data cannot reflect the current state of the solder printing step. According to various embodiments of the present disclosure, based on data collected in real time, by generating and updating a surrogate model for searching for an optimal control parameter set, it is possible to search for an optimal control parameter set corresponding to the current state of the solder printing step.

The model according to various embodiments of the present disclosure outputs (or searches for) only a control parameter set that enables a yield greater than or equal to a preset threshold value to be acquired. Therefore, even if the control parameter set is optimized in real time while the solder printing step is being performed for a plurality of substrates, it is possible to secure a yield greater than or equal to the threshold value for the solder printing step performed while the optimization is being executed.

According to various embodiments of the present disclosure, it is possible to search for only a predetermined number of control parameter sets corresponding to a predetermined number of substrates, respectively. Thereafter, since an optimal control parameter set is determined from among the searched control parameter sets and used, it is possible to prevent excessive substrate consumption in searching for a control parameter set. In some cases, it is possible to adjust the number of substrates with additional determination criteria.

According to various embodiments of the present disclosure, since optimization of a control parameter set is performed in real time while a solder printing step is performed for a plurality of substrates, it is possible to minimize a decrease in yield that may be caused by a sudden change in the solder printing step environment.

BRIEF DESCRIPTION OF DRAWINGS

FIG. 2 is a block diagram of the electronic device according to an embodiment of the present disclosure.

FIG. 3 is a view provided for explaining a model according to an embodiment of the present disclosure.

FIGS. 4A and 4B are views provided for explaining a process of searching for an optimal control parameter set according to an embodiment of the present disclosure.

FIG. 6 is an operation flowchart of the electronic device according to an embodiment of the present disclosure.

FIG. 7 is an operation flowchart of the electronic device according to an embodiment of the present disclosure.

DETAILED DESCRIPTION

Figure 1:
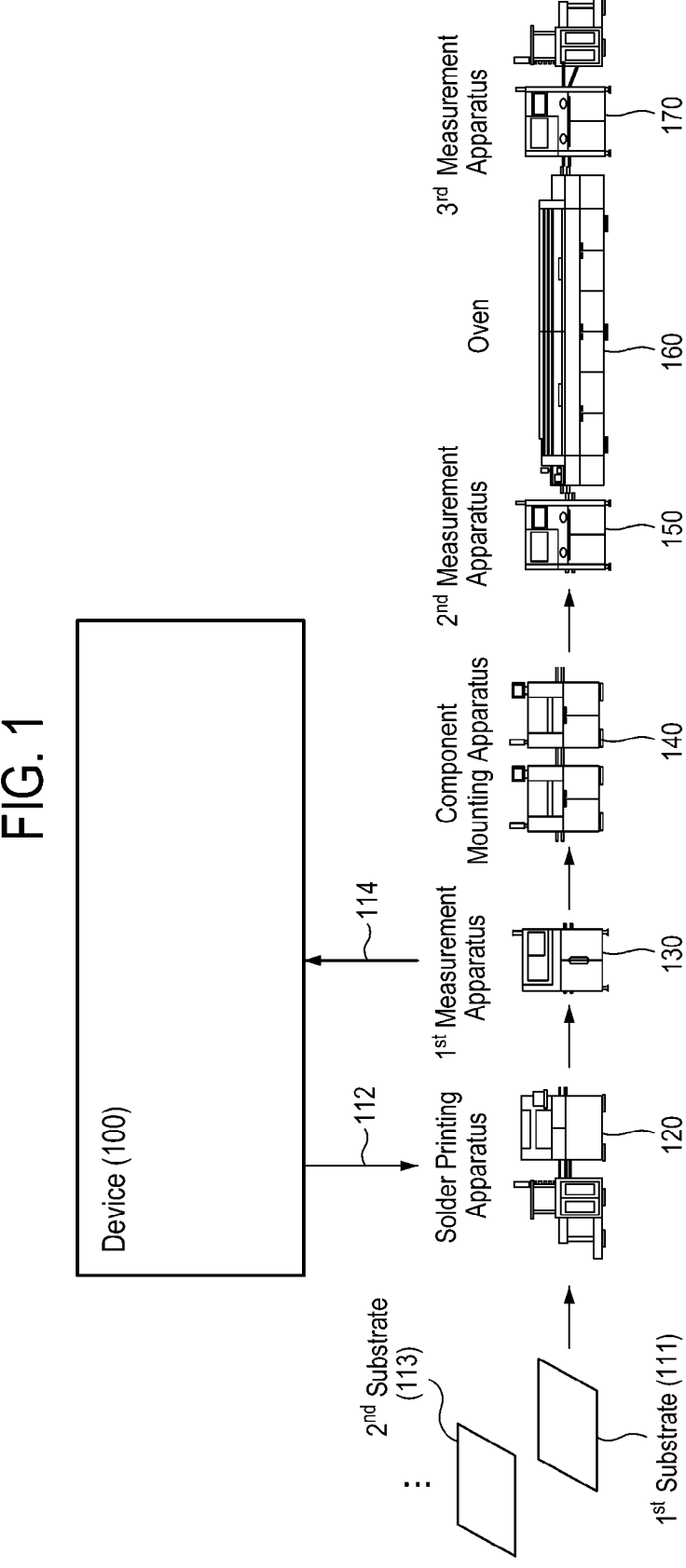
FIG. 1 is a view illustrating a process in which an electronic device according to an embodiment of the present disclosure operates.

Embodiments of the present disclosure are exemplified for the purpose of explaining the technical idea of the present disclosure. The scope of the rights according to the present disclosure is not limited to the embodiments presented below or the detailed descriptions of such embodiments.

All technical and scientific terms used in the present disclosure have the meaning generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising," "including," "having," and the like are to be understood as open-ended terms having the possibility of encompassing other embodiments, unless otherwise mentioned in the phrase or sentence containing such expressions.

The singular form used in the present disclosure may include a plural meaning unless otherwise mentioned. This applies to the singular form recited in the claims.

Terms such as "first" and "second" used in the present disclosure are used in order to distinguish a plurality of components from one another, and do not limit the order or importance of the corresponding components.

The term "part" used in the present disclosure may mean software or a hardware component, such as a field-programmable gate array (FPGA), or an application specific integrated circuit (ASIC). However, the term "part" is not limited to hardware and software. The term "part" may be configured to be provided in an addressable storage medium, and may be configured to reproduce one or more processors. Thus, as an example, "parts" may include components, such as software components, object-oriented software components, class components, and task components, processors, functions, attributes, procedures, subroutines, program code segments, drivers, firmware, microcodes, circuits, data, a database, data structures, tables, arrays, and variables. Functions provided in the components and the "parts" may be combined in a smaller number of components and "parts" or further separated into additional components and "parts."

As used herein, the expression "based on . . . " is used to describe one or more factors that affect the action or operation of a decision or determination, described in a phrase or sentence in which the expression is contained, and does not exclude additional factors that influence the action or operation of decision or determination.

In the present disclosure, where it is mentioned in the present disclosure that one element is "connected" or "joined" to another element, it is to be understood that the one element may be directly connected to the another element, or may be connected to the another element via a new additional element.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

Although process steps, method steps, algorithms, and the like are illustrated in a sequential order in flow charts illustrated in this specification, such processes, methods, and algorithms may be configured to operate in any suitable order. In other words, the steps of the processes, methods and algorithms described in various embodiments of the present disclosure need not be performed in the order described in this disclosure. In addition, although some steps are described as being performed asynchronously, in other embodiments, the some steps may be performed simultaneously. In addition, illustration of a process in a drawing does not imply that the illustrated process excludes other changes and modifications thereto, that the illustrated process or any of steps thereof are essential to one or more of the various embodiments of the present disclosure, or that the illustrated process is desirable.

FIG. 1 is a view illustrating a process in which an electronic device 100 operates for optimizing a control parameter set of a solder printing apparatus 120 according to an embodiment of the present disclosure. The electronic device 100 according to the present disclosure may determine a control parameter set of the solder printing apparatus 120 based on information acquired in a solder inspection step.

A substrate processing step may be sequentially performed on one or more substrates. The substrate processing step may include a step of printing solder on a substrate and a step of mounting and bonding components to the substrate according to a surface mounting technology. In the substrate processing step, the solder printing apparatus 120, a first measurement apparatus 130, a component mounting apparatus 140, a second measurement apparatus 150, an oven 160, and/or a third measurement apparatus 170 may be used. In the substrate processing step, the solder printing apparatus 120 may print solder on a substrate. The first measurement apparatus 130 may measure a state of the solder printed on the substrate. The component mounting apparatus 140 may mount components on the substrate printed with the solder. The second measurement apparatus 150 may measure states of the mounted components. The second measurement apparatus 150 may be referred to as a pre-automated optical inspection (AOI) apparatus. The substrate on which the components are mounted may be input into the oven 160 and undergo a reflow step. In the reflow step, the solder is melted and then hardened again, allowing the components to bond to the substrate. The third measurement apparatus 170 may measure states of the components on the substrate after the reflow step. The third measurement apparatus 170 may be referred to as a post-AOI apparatus.

The solder printing apparatus 120 may be configured to print solder on each of a plurality of substrates based on a plurality of control parameters. The solder printing apparatus 120 may be, for example, a screen printer. As used herein, a control parameter set of the solder printing apparatus 120 may indicate a set of a plurality of control parameters. The plurality of control parameters may include, for example, a control parameter for adjusting a printing pressure of the solder printing apparatus 120, a control parameter for adjusting a print speed, and a control parameter for adjusting a separation speed. A stencil mask provided with openings is disposed on a substrate prior to solder printing. The solder printing apparatus 120 prints solder on the substrate while a squeegee is progressing in a predetermined direction on the substrate on which the stencil mask is disposed. The print pressure may mean a pressure applied to the substrate by the squeegee during the solder printing. The print speed may mean a speed at which a squeegee progresses during the printing. The separation speed may refer to a speed at which the stencil mask is separated from the substrate after the printing. One or more pads may be provided on the substrate, and the pads may refer to a pair of electrodes provided on the substrate at positions where components are to be bonded. The solder printing apparatus 120 may print solder on each of one or more pads of the substrate.

A control parameter set of the solder printing apparatus 120 may correspond to a point on a multidimensional parameter space defined by a plurality of control parameters. For example, when two control parameters are set on respective axes, a control parameter set may be expressed as one point on a two-dimensional parameter space (i.e., a plane). For example, when three control parameters are set on respective axes, a control parameter set may be expressed as one point on a three-dimensional parameter space.

According to various embodiments of the present disclosure, in order to generate a model for searching for an optimal control parameter of the solder printing apparatus 120, a substrate processing step may be performed on a substrate (hereinafter, "first substrate 111"). An initial control parameter set (hereinafter, "first control parameter set") of the solder printing apparatus 120 for printing solder on the first substrate 111 may be preset and stored in the electronic device 100. In an embodiment, the first control parameter set may be set by a user. The electronic device 100 may transmit information indicating the first control parameter set to the solder printing apparatus 120. The information indicating the first control parameter set may be, for example, a signal that controls the solder printing apparatus 120 to perform a solder printing step on the first substrate 111 based on the first control parameter set.

The solder printing apparatus 120 according to various embodiments may receive the information indicating the first control parameter set and perform a solder printing step on the first substrate 111 based on the first control parameter set. After solder is printed on the first substrate 111, the first substrate 111 may be transferred from the solder printing apparatus 120 to the first measurement apparatus 130. The first measurement apparatus 130 may measure the state of the solder printed on the first substrate 111. The first measurement apparatus 130 may be referred to as a solder paste inspection (SPI) apparatus. The first measurement apparatus 130 may output solder measurement information (hereinafter, "first solder measurement information") indicating a measured state of the solder printed on the first substrate 111. The state of the solder may include at least one selected from a position, a direction, a volume, a height, and an area of the corresponding solder. The first solder measurement information may be, for example, a volume value of the solder printed on the first substrate 111.

The electronic device 100 may acquire the first solder measurement information from the first measurement apparatus 130. The electronic device 100 may determine (calculate) a yield (hereinafter, "first yield") of the first substrate 111 based on the first solder measurement information. The first yield may indicate a probability that the first substrate 111 to which the solder is applied according to the first control parameter set will be produced as a good product after the substrate processing step is completed. The first yield may be determined, for example, based on the volume value of the solder printed on the first substrate 111. In an embodiment, the yield may be calculated as a probability distribution by a probabilistic modeling methodology. For example, the first yield may be a probability distribution having a value of "average 1.96 with standard deviation 0.5". This may mean that the first substrate 111 on which the solder is printed has a probabilistic average yield of 1.96 and a standard deviation of 0.5.

The electronic device 100 may generate a model based on a data pair including a first control parameter set and a first yield (hereinafter, "first data pair"). The model may be a model for searching for (exploring) an optimal control parameter set. The optimal control parameter set may be a control parameter set of the solder printing apparatus that maximizes the yield. The model may be created by setting the first control parameter set as an independent variable (cause) of the model, and setting the first yield as an explanatory variable (result) of the model. For example, the model may be generated on the premise that the first control parameter set and the first yield have a Gaussian distribution. According to another embodiment, a squeegee direction and a squeegee angle may be added to the explanatory variable. The squeegee direction may mean a direction in which the squeegee of the solder printing apparatus 120 moves to apply pressure (e.g., a forward direction or a reverse direction). In an embodiment, each squeegee direction may be separated to generate a separate model. The squeegee angle may mean an angle of the squeegee with respect to the substrate during printing. The generated model may be stored in one or more memories of the electronic device 100. In an embodiment, the model may be generated through the above-described processes in another device and then transferred to the electronic device 100 and stored in the memories.

The electronic device 100 may acquire a second control parameter set of the solder printing apparatus 120 for printing solder on the second substrate 113 from the generated model. The second substrate 113 may be, for example, a substrate to be processed next in order the first substrate 111 in a substrate processing step. That is, solder may be printed on the second substrate 113 next in order the first substrate 111. In an embodiment, the second substrate 113 may not be a substrate to be processed immediately after the first substrate 111 is processed, but may be a substrate to be processed after a predetermined number of substrates are processed next in order the first substrate 111.

The electronic device 100 may transmit information indicating the acquired second control parameter set to the solder printing apparatus 120. The information indicating the second control parameter set may be, for example, a signal for controlling the solder printing apparatus 120 to perform a solder printing step on the second substrate 113 based on the second control parameter set. The solder printing apparatus 120 may receive the information indicating the second control parameter set and perform a solder printing step on the second substrate 113 based on the second control parameter set. After solder is printed on the second substrate 113, the second substrate 113 may be transferred from the solder printing apparatus 120 to the first measurement apparatus 130. The first measurement apparatus 130 may measure the state of the solder printed on the second substrate 113. The first measurement apparatus 130 may output second solder measurement information indicating a measured state of the solder printed on the second substrate 113. The second solder measurement information may be, for example, a volume value of the solder printed on the second substrate 113. The electronic device 100 may acquire the second solder measurement information from the first measurement apparatus 130, and may determine, based on the first solder measurement information, the yield of the second substrate 113 (hereinafter, "second yield"). The electronic device 100 may update the model based on the first data pair including the first control parameter set and the first yield and the second data pair including the second control parameter set and the second yield. The specific details of the model will be described later.

Figure 2:
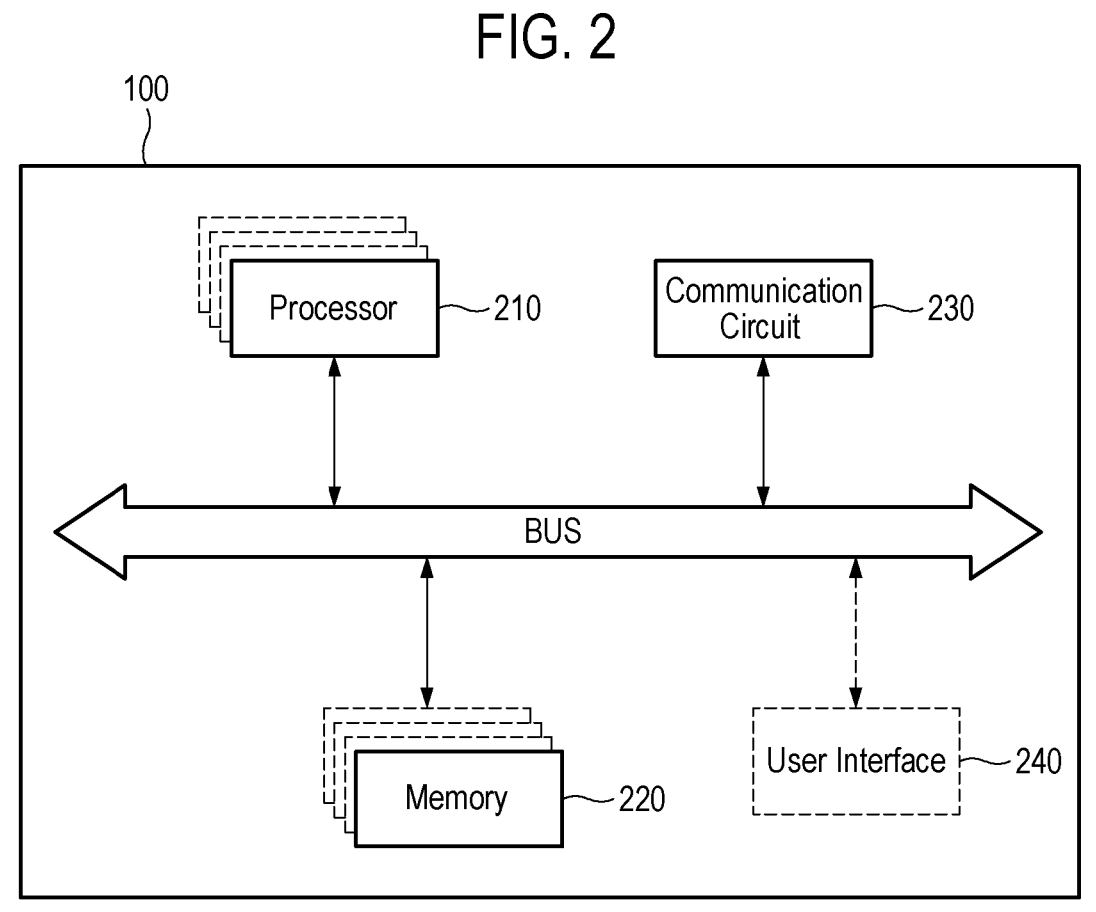

FIG. 2 is a block diagram of the electronic device 100 according to an embodiment of the present disclosure. The electronic device 100 may include one or more processors 210, one or more memories 220, and/or a communication circuit 230. According to various embodiments, at least one of these components of the electronic device 100 may be omitted or another component may be added. According to various embodiments, additionally or alternatively, some components may be implemented by being integrated with each other, or may be implemented as a single entity or multiple entities. One or more processors 210 may be referred to as a processor 210. The expression processor 210 may mean a set of one or more processors, unless the context clearly indicates otherwise. One or more memories 220 may be referred to as a memory 220. The expression memory 220 may mean a set of one or more memories, unless the context clearly indicates otherwise. In an embodiment, at least some of the internal and external components of the electronic device 100 may be connected to each other via a bus, a general purpose input/output (GPIO), a serial peripheral interface (SPI), a mobile industry processor interface (MIPI), or the like so as to exchange data and/or signals.

The processor 210 may control at least one component of a device connected to the processor 210 by driving software (e.g., a command or a program). The processor 210 may also perform various operations, processes, data generation, processing, and the like, which are related to the present disclosure. The processor 210 may also load data or the like from the memory 220 or store data in the memory 220.

The memory 220 may store various data. Data stored in the memory 220 are data acquired, processed, or used by at least one component of the electronic device 100, and may include software (e.g., commands, programs, or the like). The memory 220 may include a volatile and/or non-volatile memory 220. In the present disclosure, commands and programs are software stored in the memory 220 and may include, for example, an operating system for controlling resources of the electronic device, an application, and/or a middleware that provides various functions to the application, so that the application can utilize the resources of the electronic device. In an embodiment, the memory 220 may store commands that cause the processor 210 to perform an operation when executed by the processor 210. In an embodiment, the memory 220 may store the above-described model. In an embodiment, the memory 220 may store solder measurement information and a control parameter set of the solder printing apparatus 120.

According to various embodiments, the communication circuit 230 may perform wireless or wired communication between the electronic device 100 and a server or between the electronic device 100 and other devices. For example, the communication circuit 230 may perform wireless communication according to a system, such as enhanced Mobile Broadband (eMBB), Ultra Reliable Low-Latency Communication (URLLC), Massive Machine-Type Communication (MMTC), Long-Term Evolution (LTE), LET Advance (LETA), New Radio (NR), Universal Mobile Telecommunications System (UMTS), Global System for Mobile communications (GSM), Code Division Multiple Access (CDMA), Wideband CDMA (WCDMA), Wireless Broadband (WiBro), Wireless Fidelity (Wi-Fi), Bluetooth, Near Field Communication (NFC), Global Positioning System (GPS), or Global Navigation Satellite System (GNSS). For example, the communication circuit 230 may perform wired communication according to a system, such as Universal Serial Bus (USB), High Definition Multimedia Interface (HDMI), Recommended Standard-232 (RS-232), or Plain Old Telephone Service (POTS). In an embodiment, the electronic device 100 may communicate with the solder printing apparatus 120 and/or the first measurement apparatus 130 via the communication circuit 230. According to an embodiment, the electronic device 100 may also communicate with the component mounting apparatus 140, the second measurement apparatus 150, the oven 160, and/or the third measurement apparatus 170 via the communication circuit 230.

In an embodiment, the electronic device 100 may exist in combination with at least one of the solder printing apparatus 120, the first measurement apparatus 130, the component mounting apparatus 140, the second measurement apparatus 150, the oven 160, and third measurement apparatus 170, or may exist as a separate device. When existing in combination with at least one of the above-mentioned apparatuses (e.g., the solder printing apparatus 120), the electronic device 100 may directly exchange various pieces of information with the corresponding apparatus without going through the communication circuit 230.

In an embodiment, the electronic device 100 may further include a user interface 240. The user interface 240 may receive an input from a user and output (express) information to the user. In an embodiment, the user interface 240 may include an input device and/or an output device. The input device may be a device that receives from the outside information to be transmitted to at least one component of the electronic device 100. The input device may include, for example, a mouse, a keyboard, a touch pad, or the like. The output device may be a device that provides various pieces of information of the electronic device 100 to the user in a visual/auditory form. The output devices may include, for example, a display, a projector, a hologram, a speaker, or the like. In an embodiment, the user interface 240 may receive from the user information for controlling the electronic device 100, information for controlling a substrate processing step, or information on a substrate.

In an embodiment, the user interface 240 may receive from the user a first control parameter set of the solder printing apparatus 120 for printing solder on the first substrate 111 as initial setting. The processor 210 may acquire from the memory 220 the first control parameter set initially set by the user to the solder printing apparatus 120 for printing solder on the first substrate 111, and may transmit information indicating the first control parameter set to the solder printing apparatus 120. The processor 210 may acquire first solder measurement information indicating the state of the solder printed on the first substrate 111 from the first measurement apparatus 130, and may determine, based on the first solder measurement information, a first yield for the first substrate 111. The processor 210 may generate a model for searching for an optimal control parameter set based on a first data pair including the first control parameter set and the first yield. The processor 210 may store the generated model in the memory 220.

The processor 210 may acquire from the generated model a second control parameter set of the solder printing apparatus 120 for printing solder on a second substrate 113 on which the solder is to be printed next in order the first substrate 111, and may transmit information indicating the second control parameter set to the solder printing apparatus 120. The processor 210 may acquire second solder measurement information indicating the state of the solder printed on the second substrate 113 from the first measurement apparatus 130, and may determine, based on the second solder measurement information, a second yield for the second substrate 113. The processor 210 may update the model based on the first data pair and a second data pair including the second control parameter set and the second yield.

In an embodiment, the electronic device 100 may be any of various types of devices. For example, the electronic device 100 may be a portable communication device, a computer device, a wearable device, or a device in which two or more of the above-mentioned devices are combined. However, the electronic device 100 of the present disclosure is not limited to the above-mentioned devices.

Various embodiments of the electronic device 100 presented in the present disclosure may be combined with each other. Respective embodiments may be combined according to the number of cases, and an embodiment of the combined electronic device 100 also belongs to the scope of the present disclosure. In addition, the above-described internal/external components of the electronic device 100 according to the present disclosure may be added, changed, substituted, or deleted in accordance with embodiments. In addition, the above-described internal/external components of the electronic device 100 may be implemented using hardware components.

FIG. 3 is a view provided for explaining a model 300 according to various embodiments of the present disclosure. As described above, the model 300 may output a control parameter set 320 for printing solder on the next substrate in the substrate processing step based on the data pair 310 of the yield and the control parameter set for each of the plurality of substrates previously searched for. The model 300 may be based on an optimization algorithm for searching for an optimal control parameter set. In an embodiment, the model 300 may output the next control parameter set based on the optimization algorithm. Available algorithms may include a stochastic process such as a Monte Carlo Method, a Bayesian Optimization algorithm, a likelihood-based inference, or the like.

First, the Monte Carlo method may be used to solve most problems with a probabilistic interpretation. By the law of large numbers, an integral composed of the expected values of an arbitrary random variable may be approximated by taking an empirical mean (i.e., a sample mean) of independent samples of the variable. Using this property, when a probability distribution of the variable is parameterized, a Markov chain Monte Carlo (MCMC) sampler may be used. The Monte Carlo method may have a Gibbs Sampling algorithm. The Gibbs sampling algorithm is an MCMC algorithm for obtaining a series of observed values from a specified multivariate probability distribution when direct sampling is difficult.

A probabilistic process may refer to a mathematical object that is generally defined by random variables. The probabilistic process may represent numerical values of a system that change randomly over time. That is, the probabilistic process may be utilized as a mathematical model 300 of a system and phenomenon that appear to vary in an arbitrary manner. The probabilistic process may be interpreted by a random variable. The probabilistic process may include a Markov process, a Gaussian process, a statistical model 300, a statistical inference such as a Bayesian inference, random walks, martingales, Levy processes, random fields, renewal processes, branching processes, and the like. Here, the Bayesian inference method, also called Bayes' inference, is a statistical inference method that obtains additional information through experiments and then updates hypothesis probability by using Bayes' theorem. The Bayesian inference method is mainly applied when dynamically analyzing data to adapt to a given condition. In the field of artificial intelligence, the Bayesian interference method is used to update knowledge learned from prior data according to a condition with additional data, and a Bayesian optimization algorithm based on this is applicable.

The Gaussian process algorithm, which configures the model 300 by using the covariance and average values of variables in a probability distribution for multiple variables, has an advantage in that if only an initial hyperparameter is determined, no artificial parameter setting is additionally required unlike the existing neural network circuit.

Likelihood-based inference may include an expectation-maximization algorithm or the like. The expectation-maximization algorithm may be an iterative algorithm that finds estimates of a parameter having a maximum likelihood or maximum a posteriori in a probabilistic model 300 depending on an unobserved latent variable. The iteration of the expectation maximization algorithm may include executing an expectation step to generate a function for an evaluated log-expected value and a maximization step to compute a parameter that maximizes the expected log-expected value by using the current estimates for the parameter. The expectation-maximization algorithm may be used to find the maximum expected value parameter of a statistical model 300 when an equation cannot be directly solved.

Based on a data pair of a control parameter of the solder printing apparatus 120 for printing solder on a substrate and a yield for the substrate, the model 300 may output a control parameter set for printing solder on a next substrate. Based on the first data pair including the first control parameter set for the first substrate 111, which is the first substrate on which the substrate processing step was performed, and the first yield for the first substrate 111, the electronic device 100 may generate a model 300 for searching for an optimal control parameter set. Thereafter, the model 300 may be updated based on a data pair of a control parameter set and a yield for each of the [2, 3, . . . , n–1, n]-th substrate according to the order of the substrate processing step. In this case, the model 300 may output, based on the data pairs, a control parameter set that enables the yield of the next substrate to be greater than or equal to a preset threshold value. The threshold value may be preset by the user.

Figure 4A:
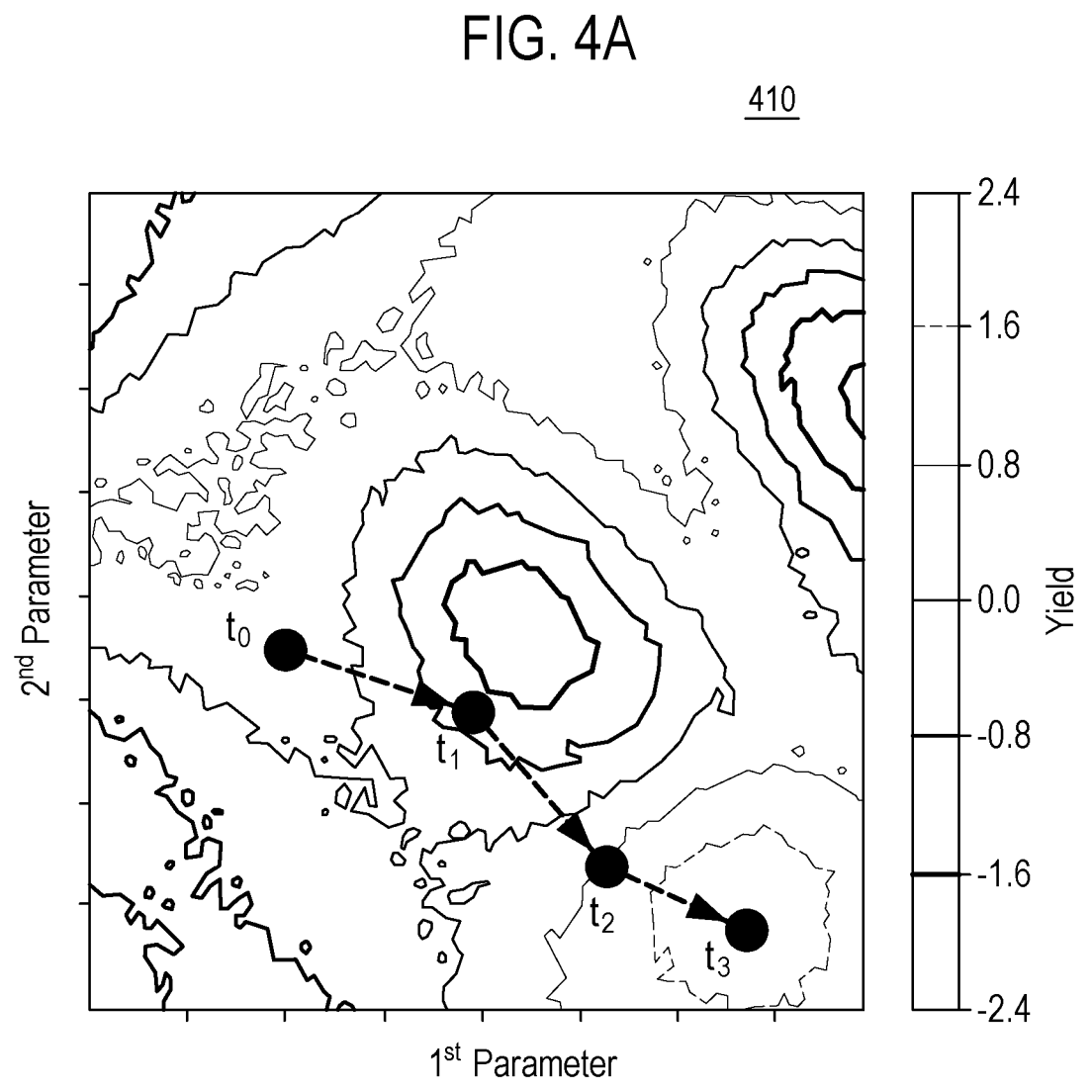
Figure 4B:
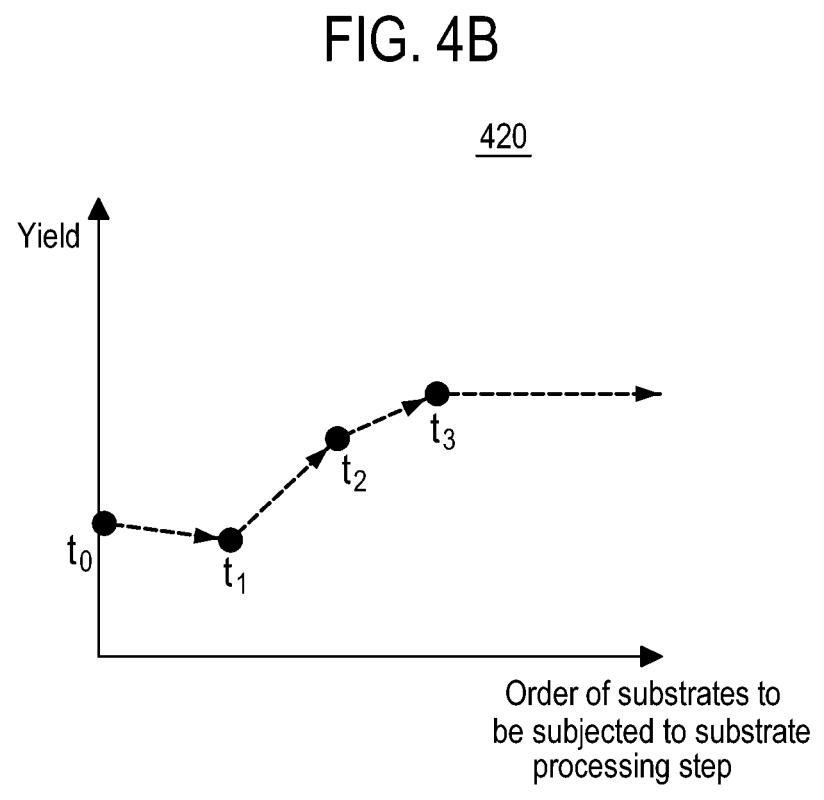

Each of FIGS. 4A and 4B is a diagram provided for explaining an optimal control parameter set search process according to an embodiment of the present disclosure. FIG. 4A is a diagram illustrating a two-dimensional parameter space 410 defined by two control parameters, and FIG. 4B is a graph 420 illustrating a yield according to the order of substrates on which a substrate processing step is performed. In FIGS. 4A and 4B, it is assumed that an optimal control parameter is searched for on a two-dimensional parameter space (plane) defined by two control parameters, but the present disclosure is not limited thereto. It is obvious that the present disclosure is also equally applicable to a three-dimensional parameter space defined by three control parameters or a multidimensional parameter space defined by four or more control parameters. The control parameter set described in this drawing may mean including the first control parameter and the second control parameter. In addition, although this drawing illustrates that an optimal control parameter set is searched while changing the control parameter set at once for convenience, it is possible to search for an optimal control parameter for each of a plurality of control parameters included in the control parameter set.

The electronic device 100 may optimize the control parameter set of the solder printing apparatus 120 in real time based on the solder measurement information indicating a state of the solder printed on the substrate measured in real time by the first measurement apparatus 130 (e.g., the SPI apparatus). Step to relates to the first substrate 111 first processed in the substrate processing step. The user may set a first control parameter set of the solder printing apparatus 120 for printing solder on the first substrate 111 via the user interface 240. For example, the user may input, as the first control parameter set, a plurality of control parameters of the solder printing apparatus 120 that make it possible to obtain a yield equal to or greater than a preset threshold value. The electronic device 100 may transmit information indicating the first control parameter set to the solder printing apparatus 120, and the solder printing apparatus 120 may print solder on the first substrate 111 based on the first control parameter set. Thereafter, the first substrate 111 on which the solder is printed is transferred from the solder printing apparatus 120 to the first measurement apparatus 130, and the first measurement apparatus 130 may measure the state of the solder printed on the first substrate 111 and generate solder measurement information indicating the state of the solder printed on the first substrate 111. The electronic device 100 may acquire the solder measurement information indicating the state of the solder printed on the first substrate 111 from the first measurement apparatus 130. The electronic device 100 may determine the first yield for the first substrate 111 based on the acquired solder measurement information. The electronic device 100 may generate, based on the first control parameter set and the first yield, a model (e.g., the model 300) for searching for an optimal control parameter set.

Step $t_1$ relates to a second substrate 113 which is next in order the first substrate 111. That is, solder may be printed on the second substrate 113 next in order the first substrate 111. The electronic device 100 may acquire, from the generated model, a second control parameter set of the solder printing apparatus 120 for printing solder on the second substrate 113. According to an embodiment, the model may search for a control parameter set that corresponds to a portion for which no search has been performed on the two-dimensional parameter space (plane), a portion from which a lot of new data can be acquired, or a portion farther apart than a previously searched portion (e.g., a point corresponding to the first control parameter set) on the two-dimensional parameter space. For example, based on the first data pair, the model may output, as the second control parameter set, a control parameter set corresponding to an arbitrary point that has not been searched for among a plurality of points included in the two-dimensional parameter space. For example, the model may output, as the second control parameter set, a control parameter set corresponding to a point distant from a point corresponding to the first control parameter set on the two-dimensional parameter space. For example, the model may output, as the second control parameter set, a control parameter set corresponding to a point at which the uncertainty in a predicted yield is the greatest among a plurality of points included in the two-dimensional parameter space. The point at which the uncertainty in a yield is the greatest may mean, for example, a point at which the variance (or standard deviation) value of the yield calculated by the probability distribution is the greatest. For example, the model may output, as the second control parameter set, a control parameter set corresponding to a point at which the variance value of the predicted yield has the largest value among a plurality of points included in the two-dimensional parameter space, or may output, as the second control parameter set, a control parameter set corresponding to a point at which the variance value of the predicted yield is greater than or equal to a preset value among the plurality of points. According to an embodiment, the model may output, as the second parameter set, a control parameter set predicted to have a second yield higher than the first yield.

The electronic device 100 may transmit information indicating the second control parameter set to the solder printing apparatus 120, and the solder printing apparatus 120 may print solder on the second substrate 113 based on the second control parameter set. Thereafter, the electronic device 100 may acquire the second solder measurement information indicating a state of the solder printed on the second substrate 113 from the first measurement apparatus 130, and may determine the second yield for the second substrate 113 based on the second solder measurement information. The electronic device 100 may update the model based on the first data pair including the first control parameter set and the first yield and the second data pair including the second control parameter set and the second yield. According to an embodiment, the electronic device 100 may update the model to output a control parameter set predicted to have a yield higher than the first yield and the second yield. According to an embodiment, the electronic device 100 may update the model to output a control parameter set corresponding to a point far away from a point corresponding to each of the first control parameter set and the second control parameter set in the two-dimensional parameter space. In this case, the electronic device 100 may update to output the control parameter set predicted to have a yield equal to or greater than a preset threshold value.

Step $t_2$ relates to a third substrate which is next in order the second substrate 113. That is, solder may be printed on the third substrate next in order the second substrate 113. The electronic device 100 may acquire, from the updated model, a third control parameter set of the solder printing apparatus 120 for printing solder on the third substrate. According to an embodiment, the model may search for a control parameter set that corresponds to a portion for which no search has been performed on the two-dimensional parameter space, a portion from which a lot of new data can be acquired, or a portion farther apart than a previously searched portion (e.g., a point corresponding to each of the first control parameter set and the second control parameter set). According to an embodiment, the model may output, as the third control parameter set, a control parameter set predicted to have a third yield higher than the first yield and the second yield. As described above regarding step $t_2$, the electronic device 100 may transmit information indicating the third control parameter set to the solder printing apparatus 120, may acquire third solder measurement information indicating the state of the solder printed on the third substrate from the first measurement apparatus 130, and may determine a third yield for the third substrate based on the third solder measurement information. The electronic device 100 may update the model based on the first data pair, the second data pair, and a third data pair including the third control parameter set and the third yield.

Step $t_3$ relates to a fourth substrate which is next in order the third substrate. That is, solder may be printed on the fourth substrate next in order the third substrate. In the same manner as described above regarding step $t_2$, a fourth control parameter and a fourth yield for the fourth substrate may be acquired, and the model may be updated based thereon.

According to the above-described method, the electronic device 100 may update the model until it searches for a predetermined number of control parameter sets. For example, the electronic device 100 may update the model only until it searches for twenty control parameter sets for twenty substrates. Thereafter, the electronic device 100 may determine an optimal parameter set based on the searched predetermined number of control parameter sets. A process of determining an optimal control parameter set by using the previous search result may be referred to as an exploitation process. The exploitation process may mean a process of searching for parameters in a direction approaching the optimum among existing search regions to find an optimal solution (an optimal control parameter set) in a parameter space. In the exploitation process, it is possible to find an optimal solution according to the tendency shown in the results of the previous search process. For example, when the electronic device 100 performs a search process for twenty control parameter sets, the electronic device 100 may determine, as the optimal control parameter set, a control parameter set having the highest yield among the twenty control parameter sets, and may transmit the control parameter set to the solder measurement apparatus. The above twenty is an exemplary number, and the number for searching the control parameter set may be variously set by the user.

In an embodiment, when a change in an environment occurs while a substrate processing step is in progress based on the optimal parameter set determined by the above-described process, the electronic device 100 may start a process of searching for a new optimal control parameter set again. In an embodiment, at least one sensor or measurement apparatus installed in the apparatuses in the substrate processing step may detect the change in the environment related to the substrate processing step. At least one sensor or measurement apparatus may transmit information indicating that there is a change in the environment of the substrate processing step to the electronic device 100. The electronic device 100 may resume the process of searching for an optimal control parameter set again by acquiring the corresponding information. For example, when detecting a change in an environment related to the substrate processing step, the electronic device 100 may newly generate a model based on a data pair including a control parameter set and a yield, and may search for an optimal control parameter set by using the newly generated model.

Figure 5:
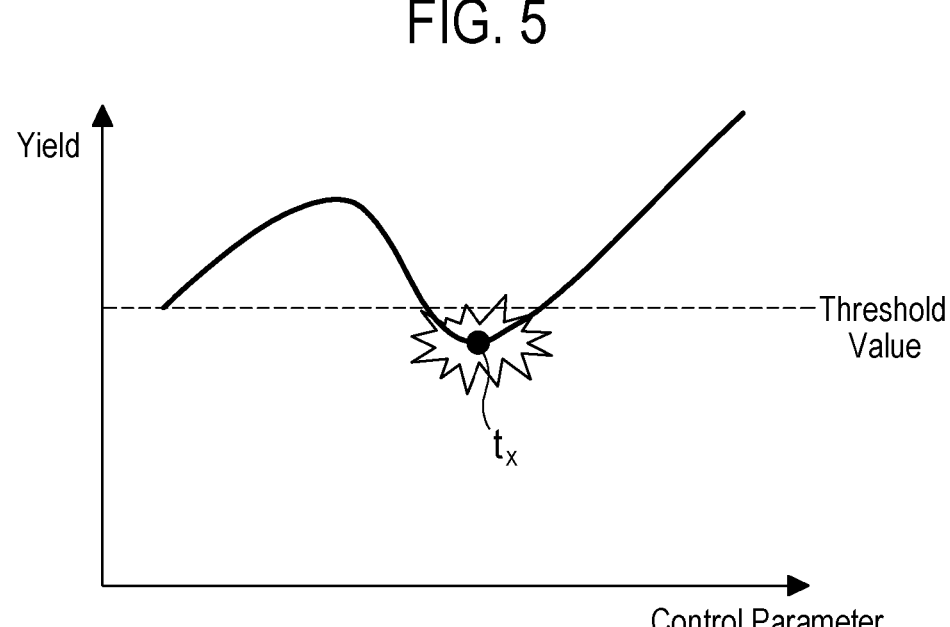
FIG. 5 is a view provided for explaining a method of considering stability in the process of searching for an optimal control parameter set according to an embodiment of the present disclosure.

FIG. 5 is a view provided for explaining a method of considering stability in the process of searching for an optimal control parameter set according to an embodiment of the present disclosure. FIG. 5 is a graph 500 illustrating a yield according to a control parameter value. In the present disclosure, based on a data pair including a control parameter set and a yield collected while performing a substrate processing step, a model for searching for an optimal control parameter set is generated and updated. Therefore, in the process of searching for the optimal control parameter set, when the yield is lowered to less than a preset threshold value by an attempted control parameter set, a loss may occur. In order to minimize the loss even during the process of searching for the optimal control parameter set, the control parameters at which a predicted yield is lower than a preset threshold value should not be searched for. Accordingly, the electronic device 100 may not search for a control parameter set $(t_x)$ predicted to have a yield equal to or less than a preset threshold value.

The electronic device 100 may generate a model for searching an optimal control parameter set based on the first data pair including the first control parameter set, which is set by the user, in the solder printing apparatus 120 for printing solder on the first substrate 111 and the first yield for the first substrate 111. Based on the first data pair, the model may output a second control parameter set that enables the second yield for the second substrate 113 next in order the first substrate 111 to be greater than or equal to a preset threshold value. That is, the model may consider whether the control parameter set to be output satisfies the preset threshold value for a yield, and does not output a control parameter set predicted to have a yield less than the preset threshold value, such that it is possible to secure stability of the substrate processing step and to prevent defective production due to the change of a control parameter.

FIG. 6 is an operation flowchart of the electronic device 100 according to an embodiment of the present disclosure. Referring to the operation flowchart 600, in operation 610, the processor 210 of the electronic device 100 may acquire a first control parameter set of the solder printing apparatus 120 for printing solder on a first substrate 111. The first control parameter set may be a combination of a plurality of control parameters, and may be initially set by the user through the user interface 240.

In operation 620, the processor 210 may transmit information indicating the first control parameter set to the solder printing apparatus 120. The information indicating the first control parameter set may be, for example, a signal for controlling the solder printing apparatus 120 to perform a solder printing step on the first substrate 111 based on the first control parameter set.

In operation 630, the processor 210 may acquire first solder measurement information indicating a state of the solder printed on the first substrate 111 from the measurement apparatus. The measurement apparatus may be a first measurement apparatus 130 (an SPI apparatus) for measuring the state of solder printed on a substrate. The first solder measurement information may be, for example, a volume value of the solder printed on the first substrate 111.

In operation 640, the processor 210 may determine a first yield for the first substrate 111 based on the first solder measurement information. The yield may be, for example, a yield determined based on the volume value of the solder printed on the first substrate 111. The yield may be determined as a probability distribution by a probabilistic modeling methodology.

In operation 650, the processor 210 may generate a model for searching for an optimal control parameter set based on a first data pair including the first control parameter set and the first yield. The model may be generated, for example, on the premise that the first control parameter set and the first yield have a Gaussian distribution. After generating the model, the process may proceed to operation A to update the model. A specific operation of updating the model will be described later with reference to FIG. 7.

FIG. 7 is an operation flowchart of the electronic device 100 according to an embodiment of the present disclosure.

The operation flowchart 700 may include operations after operation 650 of FIG. 6. In operation 710, the processor 210 may acquire, from the generated model, a second control parameter set of the solder printing apparatus 120 for printing solder on a second substrate 113 which is next in order the first substrate 111.

The model may search for a control parameter set corresponding to a portion in the multidimensional parameter space where no search has been performed, a portion in which a lot of new data can be acquired, or a portion farther away than the previously searched portion. For example, based on the first data pair, the model may output, as the second control parameter set, a control parameter set corresponding to an arbitrary point that has not been searched for among a plurality of points included in the two-dimensional parameter space. For example, the model may output, as the second control parameter set, a control parameter set corresponding to a point distant from a point corresponding to the first control parameter set on the two-dimensional parameter space. For example, the model may output, as the second control parameter set, a control parameter set corresponding to a point at which the uncertainty in a predicted yield is the greatest among a plurality of points included in the two-dimensional parameter space. According to an embodiment, the model may output, as the second parameter set, a control parameter set predicted to have a second yield higher than the first yield. In all of the above cases, the model may output, as the second control parameter set, a control parameter set that enables the second yield to be equal to or greater than a preset threshold value.

In operation 720, the processor 210 may transmit information indicating the second control parameter set to the solder printing apparatus 120. In operation 730, the processor 210 may acquire second solder measurement information indicating a state of the solder printed on the second substrate 113 from the measurement apparatus. In operation 740, the processor 210 may determine a second yield for the second substrate 113 based on the second solder measurement information.

The processor 210 may update the model based on the first data pair and a second data pair including the second control parameter set and the second yield. According to an embodiment, the processor 210 may update the model to output a control parameter set predicted to have a yield higher than the first yield and the second yield. According to an embodiment, the processor 210 may update the model to output a control parameter set corresponding to a point far away from a point corresponding to each of the first control parameter set and the second control parameter set in the multidimensional parameter space. In this case, the processor 210 may update to output only the control parameter set predicted to have a yield equal to or greater than a preset threshold value.

While the foregoing methods have been described with respect to particular embodiments, these methods may also be implemented as computer-readable code on a computer-readable recording medium. The computer-readable recoding medium includes any kind of data storage devices that can be read by a computer system. Examples of the computer-readable recording medium include ROM, RAM, CD-ROM, magnetic tape, floppy disk, optical data storage device and the like. Also, the computer-readable recoding medium can be distributed to computer systems which are connected through a network so that the computer-readable code can be stored and executed in a distributed manner. In addition, the functional programs, code and code segments for implementing the foregoing embodiments can easily be inferred by programmers in the art to which the present disclosure pertains.

What is claimed is:

1. An electronic device comprising:
   a communication circuit that is communicatively connected to a solder printing apparatus configured to print solder on each of a plurality of substrates based on a plurality of control parameters and a solder paste inspection apparatus configured to measure a state of the solder printed on each of the plurality of substrates transferred from the solder printing apparatus;
   one or more memories; and
   one or more processors that are operatively connected to the communication circuit and the one or more memories,
   wherein the one or more processors are configured to:
   acquire a first control parameter set of the solder printing apparatus for printing solder on a first substrate;
   transmit information indicating the first control parameter set to the solder printing apparatus;
   acquire, from the solder paste inspection apparatus, first solder measurement information indicating a state of the solder printed on the first substrate;
   determine a first yield for the first substrate based on the first solder measurement information;
   generate a model for searching for an optimal control parameter set based on a first data pair including the first control parameter set and the first yield; and
   acquire, from the model, a second control parameter set of the solder printing apparatus for printing solder on a second substrate on which solder is to be printed next in order of the first substrate, and
   wherein the second control parameter set is determined based on a variance value indicating uncertainty of a predicted yield being largest among a plurality of points included on a multidimensional parameter space defined by the plurality of control parameters.

2. The electronic device of claim 1, wherein the one or more processors are configured to:
   transmit information indicating the second control parameter set to the solder printing apparatus;
   acquire, from the solder paste inspection apparatus, second solder measurement information indicating a state of the solder printed on the second substrate;
   determine a second yield for the second substrate based on the second solder measurement information; and
   update the model based on the first data pair and a second data pair including the second control parameter set and the second yield.

3. The electronic device of claim 2, wherein the model outputs, based on the first data pair, the second control parameter set that enables the second yield to be greater than or equal to a preset or automatically set threshold value.

4. The electronic device of claim 2, wherein the model outputs, based on the first data pair, the second control parameter set that enables the second yield to increase over the first yield.

5. The electronic device of claim 2, wherein the one or more processors are configured to update the model until a predetermined number of control parameter sets are searched for.

6. The electronic device of claim 5, wherein the one or more processors are configured to:
   determine a control parameter set having a highest corresponding yield among the predetermined number of control parameter sets as the optimal control parameter set after searching for the predetermined number of control parameter sets; and transmit information indicating the optimal control parameter set to the solder printing apparatus.

7. The electronic device of claim 1, wherein the plurality of control parameters include a control parameter for adjusting a print pressure of the solder printing apparatus, a control parameter for adjusting a print speed, and a control parameter for adjusting a substrate separating speed.

8. The electronic device of claim 2, wherein each of the first control parameter set and the second control parameter set corresponds to one point on the multidimensional parameter space defined by the plurality of control parameters.

9. The electronic device of claim 8, wherein the model outputs, based on the first data pair, the second control parameter set corresponding to an unsearched arbitrary point among a plurality of points included in the multidimensional parameter space.

10. The electronic device of claim 9, wherein the arbitrary point is a point at which uncertainty of a predicted yield is greatest among the plurality of points.

11. The electronic device of claim 2, wherein the first yield and the second yield are determined as a probability distribution by a probabilistic modeling methodology.

12. The electronic device of claim 1, wherein the first control parameter set is set by a user.

13. A method of optimizing a control parameter of an electronic device that is communicatively connected to a solder printing apparatus configured to print solder on each of a plurality of substrates based on a plurality of control parameters and a solder paste inspection apparatus configured to measure a state of the solder printed on each of the plurality of substrates transferred from the solder printing apparatus, the method comprising:

acquiring a first control parameter set of the solder printing apparatus for printing solder on a first substrate;

transmitting information indicating the first control parameter set to the solder printing apparatus;

acquiring, from the solder paste inspection apparatus, first solder measurement information indicating a state of the solder printed on the first substrate;

determining a first yield for the first substrate based on the first solder measurement information;

generating a model for searching for an optimal control parameter set based on a first data pair including the first control parameter set and the first yield;

acquiring, from the model, a second control parameter set of the solder printing apparatus for printing solder on a second substrate on which solder is to be printed next in order of the first substrate, wherein the second control parameter set is determined based on a variance value indicating uncertainty of a predicted yield being largest among a plurality of points included on a multidimensional parameter space defined by the plurality of control parameters.

14. The method of claim 13, further comprising:

transmitting information indicating the second control parameter set to the solder printing apparatus;

acquiring, from the solder paste inspection apparatus, second solder measurement information indicating a state of the solder printed on the second substrate;

determining a second yield for the second substrate based on the second solder measurement information; and updating the model based on the first data pair and a second data pair including the second control parameter set and the second yield.

15. The method of claim 14, wherein the model outputs, based on the first data pair, the second control parameter set that enables the second yield to be greater than or equal to a preset threshold value.

16. The method of claim 14, wherein the model outputs, based on the first data pair, the second control parameter set that enables the second yield to increase over the first yield.

17. The method of claim 13, wherein the plurality of control parameters include a control parameter for adjusting a print pressure of the solder printing apparatus, a control parameter for adjusting a print speed, and a control parameter for adjusting a substrate separating speed.

18. The method of claim 14, wherein each of the first control parameter set and the second control parameter set corresponds to one point on the multidimensional parameter space defined by the plurality of control parameters.

19. The method of claim 18, wherein the model outputs, based on the first data pair, the second control parameter set corresponding to an unsearched arbitrary point among a plurality of points included in the multidimensional parameter space.

20. The method of claim 14, wherein the first yield and the second yield are determined as a probability distribution by a probabilistic modeling methodology.

* * * * *